United States Patent Office 2,881,794
Patented Apr. 14, 1959

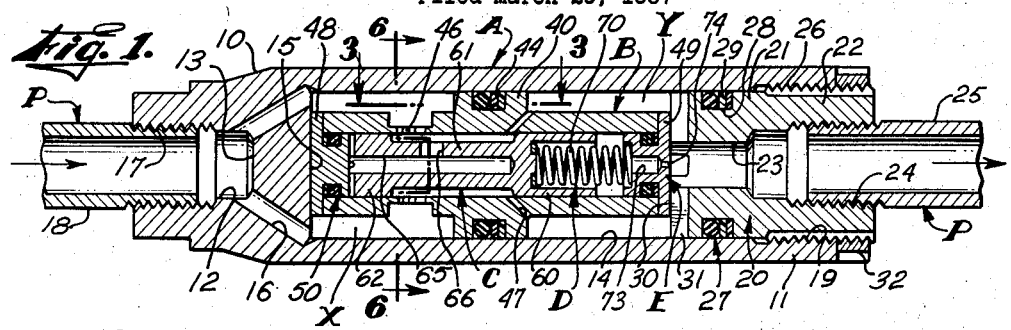

2,881,794
FLOW LIMITER

Lee E. Baldwin and Marinus C. Bokelman, Los Angeles, Calif., assignors to Conair, Inc., Glendale, Calif., a corporation of California Application March 29, 1957, Serial No. 649,546

10 Claims. (Cl. 137—501)

This invention relates to a flow limiter valve construction and more particularly to such a construction for use in hydraulic systems to control the volumetric rate or flow of fluid to pumps or fluid operated servo units and the like in the systems.

It is a general object of the present invention to provide a novel and improved flow limiter or valve construction adapted to be engaged in a fluid handling pipeline and which is responsive to hydraulic pressure within the line for automatically regulating the volumetric rate or flow of fluid therethrough.

Another object of the present invention is to provide a construction of the general character referred to which is not materially affected by variations in the heat and viscosity of the fluid being handled and which is responsive to slight variations in pressure and surging of the fluid being handled.

A feature of the present invention is to provide a flow limiter of the character referred to having a tubular body, a tubular fluid conducting sleeve within the body with longitudinally spaced lateral openings therein and a spring loaded pressure responsive spool or plunger within the sleeve and controlling the flow of fluid therethrough. The plunger is adapted to cooperate with the upstream openings in the sleeve to control the flow of fluid into the sleeve, while the downstream openings in the sleeve serve to conduct the fluid from within the sleeve and establish a pressure drop in the construction for operation of the plunger.

Another feature of our invention is to provide a flow limiter wherein the upstream or flow controlling openings in the sleeve are of novel configuration to effect a wide variation in flow upon limited longitudinal shifting of the spool relative thereto.

A further object of the present invention is to provide a construction of the character referred to which is neat and compact, which is easy and economical of manufacture and which is both highly effective and dependable in operation.

The various objects and features of our invention will be fully understood from the following detailed description of a typical preferred form and application of our invention, throughout which description reference is made to the accompanying drawings, in which:

Fig. 1 is a longitudinal sectional view showing our flow limiter in an unactuated position.

Fig. 2 is a view similar to Fig. 1, showing the flow limiter in an actuated position.

Fig. 3 is an elevational view of a portion of the fluid conducting sleeve and spool taken as indicated by line 3—3 on Fig. 1.

Fig. 4 is a view similar to Fig. 3, taken as indicated by line 4—4 on Fig. 2.

Fig. 5 is a transverse sectional view taken as indicated by line 5—5 on Fig. 2.

Fig. 6 is a transverse sectional view taken as indicated by line 6—6 on Fig. 1.

The flow limiter construction provided by the present invention and illustrated throughout the drawings is adapted to be engaged in a pipeline P and is shown as including an elongate tubular body A, an elongate tubular fluid handling sleeve B engaged in the body and defining longitudinally spaced upstream and downstream annular chambers X and Y, an elongate fluid pressure responsive valving member or plunger C slidably engaged in the sleeve and controlling the flow of fluid therethrough and from one chamber to the other, spring means D normally yieldingly urging the plunger C to an unactuated position, and buffer means E controlling the action of the plunger C and the spring means D.

The body A is an elongate member having front and rear end portions 10 and 11, a central longitudinally disposed inlet passage 12 of limited longitudinal extent entering the body from its forward end and terminating at a flat bottom 13, a central longitudinally disposed bore 14 of considerable longitudinal extent entering the body A from its rear end and terminating at a flat bottom 15 in the forward portion 10 of the body, and spaced from the bottom of the inlet passage 12 and a plurality of circumferentially spaced ports 16 extending between and establishing open communication with the passage 12 and the bore 14. The bore 14 is substantially larger in diameter than the inlet passage 12, and the ports 16 diverge rearwardly from the bottom of the passage 12, and communicate with the bore 14 about the outer periphery of the bottom 15 thereof, as clearly illustrated in Figs. 1 and 2 of the drawings.

The forward end portion of the inlet passage 12 is internally threaded as at 17 to threadedly receive the end of a pipe 18 of the pipeline P, while the rear end portion of the bore 14 is internally threaded as at 19 to threadedly receive a suitable plug 20. The plug 20 engaged in the bore 14 is an elongate element having front and rear portions 21 and 22 and a central longitudinal outlet passage 23 extending therethrough to establish open communication with the interior of the body. The rear portion of the outlet passage 23 is threaded as at 24 to threadedly receive a pipe 25 of the pipeline P.

The rear portion 22 of the plug 20 is externally threaded as at 26 to cooperatively engage with the threads 19 in the bore 14, while the forward portion 20 of the plug slidably enters the bore 14 and carries a suitable sealing means 27 to seal between the plug and the bore. In the case illustrated, the sealing means 27 is shown as including an annular groove 28 about the exterior of the plug and suitable packing rings 29 engaged in the groove and sealing with the bore.

The plug 20 has a flat radially disposed inner or front face 30, which face is provided with a plurality of radially disposed notches 31 adapted to conduct fluid from the rear and outer peripheral portion of the bore defining the downstream chamber Y, to the outlet passage 23 as will hereinafter be described.

In the particular case illustrated, a suitable lock nut 32 is provided on the outer or rear end portion of the plug 20 to engage the body A and to maintain the plug in fixed position therein.

The fluid handling sleeve B is an elongate tubular member engaged in the body A to extend between the bottom 15 of the bore 14 and the inner face 30 of the plug 20. The sleeve B is substantially smaller in diameter than the bore 14 and is arranged coaxially therewith to establish an annular space between the exterior of the sleeve and the wall of the bore. A radially outwardly projecting flange-like partition 40 is provided on the sleeve, intermediate its ends, to slidably engage in the bore of the body and to divide the said space into the front and rear annular, upstream and downstream chambers X and Y, respectively.

The partition 40 is shown provided with an annular groove 43 about its outer periphery and in which suitable sealing rings 44 are engaged to seal with the bore and prevent passage of fluid from one chamber to the other.

The sleeve B is further provided with a central longitudinal cylinder bore 45 extending from one end thereof to the other, one or more circumferentially spaced lateral metering ports 46 in the forward portion of the sleeve and establishing open communication between the upstream or inlet chamber X and the cylinder bore 45, and one or more circumferentially spaced substantially radially disposed orifices 47 spaced longitudinally rearwardly of the ports 46 and establishing open communication between the cylinder bore and the downstream or outlet chamber Y.

The front and rear ends of the sleeve B are closed by suitable front and rear heads 48 and 49, respectively. Each head is shown as including a plug-like body slidably engaged in the cylinder bore and a radially outwardly projecting flange corresponding in outside diameter with the sleeve B and adapted to overlie its related end of the sleeve and to be held in clamped relationship between the said end of the sleeve and the bottom 15 of the bore 14, or the end face 30 of the plug 20.

In the case illustrated, a suitable sealing means 50 is provided about the body of each head to prevent leakage or the passage of fluid thereby.

With the above relationship of parts, it will be apparent that fluid in the pipe 18 engaged in the forward end of the body A and communicating with the inlet passage 12, flows freely into the upstream or inlet chamber X through the duct 16, whereupon it flows into the cylinder bore 45 in the sleeve B through the metering ports 46. The fluid then flows outwardly from the cylinder bore 45 through the orifices 47 into the outlet chamber Y where it is then free to flow through the notches 31 in the end face 30 of the plug 20, into the outlet passage 23 and into the pipe 25 engaged in the plug.

In practice, the orifices 47 are of limited cross-section and serve to establish a pressure drop between the cylinder bore and the downstream or outlet chamber Y.

The plunger C is an elongate longitudinally disposed spool-like valving member having a rearwardly opening cup-shaped base 60 having sliding sealing engagement in the rear end portion of the cylinder bore 45 in the sleeve B and spaced from and opposing the rear head 49, an elongate shank 61 of reduced diameter projecting forwardly from the base, past the orifices and the metering ports 47 and 46, and an elongate piston head 62 at the forward end of the shank and establishing sliding sealing engagement with the cylinder bore 45 and adapted to oppose the forward head 48 in the sleeve and to normally occur forward of the metering ports 46 in the sleeve.

The plunger C is further provided with a central longitudinally disposed flow passage 65 entering it from the forward terminal end thereof and terminating at a point intermediate its ends, and a lateral port 66 in the shank 61 and establishing open communication between the passage 65 and the cylinder bore 45, between the head and the base of the plunger.

With the above relationship of parts, it will be apparent that fluid introduced into the annulus about the shank 61 of the plunger C, through the metering ports 46, is conducted to the forward end of the cylinder bore 45, to act on the piston head 62 and normally urges the plunger rearwardly in the cylinder bore.

The piston head 62 is adapted to overlie portions of the metering ports 46 when the piston head 62 is shifted rearward, to restrict and control the flow of fluid therethrough and in a manner that will hereinafter be described.

The spring means D is adapted to normally yieldingly urge the plunger C forwardly in the cyclinder bore 45 and to counteract and balance the force of the fluid acting on the piston head 62, and is shown as including a compression spring 70 engaged between the plunger C and the head 49 at the rear end of the sleeve B. In the particular case illustrated, the forward portion of the spring 70 is engaged in and carried by the rearwardly opening cup-shaped base 60 of the plunger C while the rear portion is engaged or seated in a bore 71 provided in the forward end of the body of the head 49.

The buffer means E is adapted to limit or control the rate at which the plunger C can move in the sleeve B, as a result of fluid action within the structure or as a result of the action of the spring 70 of the means D. In the case illustrated, the means E is shown as including a counter bore 73 continuing from the bottom of the bore 71 in the head 49 at the rear end of the sleeve B and an orifice 74 continuing rearwardly from the counterbore and establishing open communication between the outlet passage 23 in the plug 20 and the space occurring between the base 60 of the plunger and the head 49.

With the structure set forth above, it will be apparent that when the fluid pressure forward or upstream of the orifices 47 in the sleeve B and acting on the piston head 62, overcomes the resistance afforded by the spring 70, the piston head moves rearwardly to overlie the metering ports 46 in the sleeve, thereby restricting the flow of fluid therethrough. The piston continues to move rearwardly until sufficient flow is shut off through the metering ports so that pressure of the fluid acting on the piston head is balanced with the force exerted by the spring 70 of the means D.

It will be further apparent that as the upstream pressure increases, decreases, or surges, and the plunger C is shifted in the cylinder bore 45 of the sleeve B, the rate at which the plunger can move is limited and the action of the device is smoothed out by the buffer means E, that is, by the restricted flow of fluid through the orifice 74 in the head 49.

In the preferred form of the invention, the metering ports 46 in the sleeve B and with which the piston head 62 of the plunger C cooperates to control the rate of flow through the device are of novel configuration so that a wide variation of flow can be obtained with a minimum amount of movement by the plunger, and with the result that the device is highly sensitive and rapid in operation.

The metering ports 46 are shown as being of semi-curvilinear triangular configuration, the base 76 being straight and extending transverse the longitudinal axis of the sleeve and the sides 77 being convex and converging rearwardly relative to the longitudinal axis of the sleeve as clearly illustrated in Figs. 3 and 4 of the drawings. With this configuration, it will be apparent that prior to rearward shifting or actuation of the piston head 62 where it overlies a portion of the ports, the ports afford maximum and free flow of fluid into the cylinder bore 45. It will be further apparent that when the pressure acting upon the piston head overcomes the resistance afforded by the spring 70 and shifts the head rearwardly to overlie the ports, the rate of flow through the ports is progressively and smoothly restricted.

The curvature of the sides 77 of the ports 46 is governed or controlled by the particular characteristics of the spring 70 of the means D, that is, its strength and variations in resistance as it is compressed.

In practice, where the structure provided by the present invention is designed to operate in a particular pressure range, a spring 70 of the proper strength must be provided and the configuration of the metering ports 46 must be changed or varied accordingly.

With the structure that we provide, it will be apparent that by the arrangement and relative positioning of the metering ports 46 and orifices 47, which establish the required pressure drop in the device for operation, the rate of flow through the orifices is maintained substantially constant with the result that the change in viscosity of the fluid passing through the orifices 47, and as a result of the heat generated by the friction of the fluid passing therethrough, remains substantially constant.

Having described only a typical preferred form and application of our invention, we do not wish to be limited or restricted to the specific details herein set forth, but wish to reserve to ourselves any variations or modifications that many appear to those skilled in the art and fall within the scope of the following claims.

Having described our invention, we claim:

1. A flow limiter of the character described including, an elongate body having front and rear ends, an inlet passage in the front end of the body and an outlet passage in the rear end of the body, a longitudinally disposed cylinder bore in the body, a metering port establishing open communication between the inlet passage and the forward portion of the bore, an orifice establishing open communication between the rear portion of the bore and the outlet passage and adapted to establish a pressure drop between the inflowing fluid and the outflowing fluid, an elongate plunger in the bore and having a piston head at one end to normally occur forward of the metering port and establishing sliding sealing engagement in the bore, a base at the other end of the plunger to occur rearward of the orifice and establishing sliding sealing engagement in the bore, means conducting fluid upstream of the orifice into the bore forward of the piston to shift the piston rearwardly to overlie the metering port and to control the flow of fluid therethrough, means conducting fluid downstream of the orifice into the bore rearward of the base, and spring means in the bore to act on the base of the plunger and normally yieldingly urging the plunger and the piston forwardly in the bore.

2. A flow limiter of the character described including, an elongate body having front and rear ends, an inlet passage in the front end of the body and an outlet passage in the rear end of the body, a longitudinally disposed cylinder bore in the body, a plurality of circumferentially spaced metering ports establishing open communication between the inlet passage and the forward portion of the bore, a plurality of circumferentially spaced orifices establishing open communication between the rear portion of the bore and the outlet passage and adapted to establish a pressure drop between the inflowing and outflowing fluid, an elongate plunger in the bore and having a piston head at one end to normally occur forward of the metering ports and establishing sliding sealing engagement in the bore, a base at the other end of the plunger to occur rearward of the orifices and establishing sliding sealing engagement in the bore, means conducting fluid upstream of the orifices into the bore forward of the piston to shift the piston rearwardly to overlie the metering port and control the flow of fluid therethrough, means conducting fluid downstream of the orifices into the bore rearward of the base, and spring means in the bore to act on the base of the plunger and normally yieldingly urging the plunger and the piston forward in the bore.

3. A flow limiter of the character described including, an elongate body having front and rear ends, an inlet passage in the front end of the body and an outlet passage in the rear end of the body, a longitudinally disposed cylinder bore in the body, a metering port establishing open communication between the inlet passage and the forward portion of the bore, an orifice establishing open communication between the rear portion of the bore and the outlet passage and adapted to establish a pressure drop between the inflowing and outflowing fluid, an elongate plunger in the bore and having a piston head at one end to normally occur forward of the metering port and establishing sliding sealing engagement in the bore, a base at the other end of the plunger to occur rearward of the orifice and establishing sliding sealing engagement in the bore, a longitudinal flow passage entering the forward end of the plunger and a lateral port in the plunger rearward of the piston and communicating with the flow passage to conduct fluid upstream of the orifice into the bore forward of the piston to shift the piston rearwardly to overlie the metering port and control the flow of fluid therethrough, buffer means conducting fluid downstream of the orifice into and out of the bore rearward of the base to control the rate of movement of the plunger, and spring means in the bore to act on the base of the plunger and normally yieldingly urging the plunger and the piston forward in the bore.

4. A flow limiter of the character described including, an elongate body having front and rear ends, an inlet passage in the front end of the body and an outlet passage in the rear end of the body, a longitudinally disposed cylinder bore in the body, a semi-curvilinear triangular metering port having a base extending transverse the longitudinal axis of the body and rearwardly convergent convex sides, establishing open communication between the inlet passage and the forward portion of the bore, an orifice establishing open communication between the rear portion of the bore and the outlet passage and adapted to establish a pressure drop between the inflowing and outflowing fluid, an elongate plunger in the bore and having a piston head at one end to normally occur forward of the metering port and establishing sliding sealing engagement in the bore, a base at the other end of the plunger to occur rearward of the orifice and establishing sliding sealing engagement in the bore, means conducting fluid upstream of the orifice into the bore forward of the piston to shift the piston rearwardly to overlie the metering port and control the flow of fluid therethrough, means conducting fluid downstream of the orifice into the bore rearward of the base, and spring means in the bore to act on the base of the plunger and normally yieldingly urging the plunger and the piston forward in the bore.

5. A flow limiter of the character described including, an elongate body having front and rear ends, an inlet passage in the front end of the body and an outlet passage in the rear end of the body, a longitudinally disposed cylinder bore in the body, a plurality of circumferentially spaced semi-curvilinear triangular metering ports having rearwardly convergent sides establishing open communication between the inlet passage and the forward portion of the bore, and a plurality of circumferentially spaced orifices establishing open communication between the rear portion of the bore and the outlet passage and adapted to establish a pressure drop between the inflowing and outflowing fluid, an elongate plunger in the bore and having a piston head at one end to normally occur forward of the metering ports and establishing sliding sealing engagement in the bore, a base at the other end of the plunger to occur rearward of the orifices and establishing sliding sealing engagement in the bore, a longitudinal flow passage entering the forward end of the plunger and a lateral port in the plunger rearward of the piston and communicating with the flow passage to conduct fluid into the bore forward of the piston to shift the piston rearwardly to overlie the metering ports and control the flow of fluid therethrough, buffer means conducting fluid into and out of the bore rearward of the base to control the rate of movement of the plunger, and spring means in the bore to act on the base of the plunger and normally yieldingly urging the plunger and the piston forward in the bore.

6. A flow limiter of the character described including, an elongate body having front and rear ends, an inlet passage in the front end of the body, an outlet passage in the rear end of the body, an elongate longitudinally disposed bore in the body extending between and connected with the inlet and outlet passages, an elongate flow control sleeve of smaller diameter than the bore in the body and engaged in the bore in the body to extend between the inlet and outlet passages, a flange partition intermediate the ends of the sleeve and sealed with the bore in the body to establish upstream and downstream chambers about the sleeve, a central longitudinally disposed cylinder bore in the sleeve, heads at the ends of the sleeve and closing the cylinder bore, a metering port in the sleeve forward of the flange and establishing open communication between the upstream chamber and the cylinder bore, an orifice in the sleeve rearward of the flange and establishing open communication between the cylinder bore and the downstream chamber and adapted to establish a pressure drop between the fluid in the cylinder bore and the fluid in the downstream chamber, an elongate plunger in the cylinder bore having a base spaced rearward of the orifice, a stem of reduced diameter projecting forwardly from the base, and a piston head at the forward end of the stem to normally occur forward of the metering port, a longitudinal flow passage extending into the plunger from the front end of the piston, a lateral port in the stem and communicating with the flow passage, said lateral port and flow passage adapted to conduct fluid into the cylinder bore forward of the piston to urge the piston rearwardly into lapped engagement with the metering port in the sleeve to control the flow of fluid therethrough, an orifice in the head at the rear end of the sleeve and conducting fluid into and out of the cylinder bore rearward of the plunger base, and a compression spring in the cylinder bore between the plunger base and the head at the rear end of the sleeve and normally yieldingly urging the plunger forward and against the action of fluid on the piston head.

7. A flow limiter of the character described including, an elongate body having front and rear ends, an inlet passage in the front end of the body, an outlet passage in the rear end of the body, an elongate longitudinally disposed bore in the body extending between and connected with the inlet and outlet passages, an elongate flow control sleeve of smaller diameter than the bore in the body and engaged in the bore in the body to extend between the inlet and outlet passages, a radially outwardly projecting flange-like partition intermediate the ends of the sleeve and sealed with the bore in the body to establish upstream and downstream chambers about the sleeve, a central longitudinally disposed cylinder bore in the sleeve, heads at the ends of the sleeve and closing the cylinder bore, a plurality of circumferentially spaced metering ports in the sleeve forward of the flange and establishing open communication between the upstream chamber and the cylinder bore, a plurality of circumferentially spaced orifices in the sleeve rearward of the flange and establishing open communication between the cylinder bore and the downstream chamber and adapted to establish a pressure drop between the fluid in the cylinder bore and the fluid in the downstream chamber, an elongate plunger in the cylinder bore having a base spaced rearward of the orifices, a stem of reduced diameter projecting forwardly from the base, and a piston head at the forward end of the stem to normally occur forward of the metering ports, a longitudinal flow passage extending into the plunger from the front end of the piston and a lateral port in the stem and communicating with the flow passage, said lateral port and flow passage adapted to conduct fluid into the cylinder bore forward of the piston to urge the piston rearwardly into lapped engagement with the metering port in the sleeve to control the flow of fluid therethrough, an orifice in the head at the rear end of the sleeve and conducting fluid into and out of the cylinder bore rearward of the plunger base, and a compression spring in the cylinder bore between the plunger base and the head at the rear end of the sleeve and normally yieldingly urging the plunger forward and against the action of the fluid on the piston head.

8. A flow limiter of the character described including, an elongate body having front and rear ends, an inlet passage in the front end of the body, an outlet passage in the rear end of the body, an elongate longitudinally disposed bore in the body extending between and connected with the inlet and outlet passages, an elongate flow control sleeve of smaller diameter than the bore in the body and engaged in the bore in the body to extend between the inlet and outlet passages, a flange-like partition intermediate the ends of the sleeve and sealed with the bore in the body to establish upstream and downstream chambers about the sleeve, a central longitudinally disposed cylinder bore in the sleeve, heads at the ends of the sleeve and closing the cylinder bore, a semi-curvilinear triangular metering port having a base extending transverse the longitudinal axis of the sleeve and rearwardly convergent convex sides in the sleeve forward of the flange and establishing open communication between the upstream chamber and the cylinder bore, an orifice in the sleeve rearward of the flange and establishing open communication between the cylinder bore and the downstream chamber and adapted to establish a pressure drop between the fluid in the cylinder bore and the fluid in the downstream chamber, an elongate plunger in the cylinder bore having a base spaced rearward of the orifice, a stem of reduced diameter projecting forwardly from the base, and a piston head at the forward end of the stem to normally occur forward of the metering ports, a longitudinal flow passage extending into the plunger from the front end of the piston and a lateral port in the stem and communicating with the flow passage, said lateral port and flow passage adapted to conduct fluid into the cylinder bore forward of the piston to urge the piston rearwardly into lapped engagement with the metering port in the sleeve to control the flow of fluid therethrough, an orifice in the head at the rear end of the sleeve and conducting fluid into and out of the cylinder bore rearward of the plunger base, and a compression spring in the cylinder bore between the plunger base and the head at the rear end of the sleeve and normally yieldingly urging the plunger forward and against the action of the fluid on the piston head.

9. A flow limiter of the character described including, an elongate body having front and rear ends, an inlet passage in the front end of the body, an outlet passage in the rear end of the body, an elongate longitudinally disposed bore in the body extending between and connected with the inlet and outlet passages, an elongate flow control sleeve of smaller diameter than the bore in the body and engaged in the bore in the body to extend between the inlet and outlet passages, a radially outwardly projecting flange-like partition intermediate the ends of the sleeve and sealed with the bore in the body to establish upstream and downstream chambers about the sleeve, a central longitudinally disposed cylinder bore in the sleeve, heads at the ends of the sleeve and closing the cylinder bore, a plurality of circumferentially spaced semi-curvilinear triangular metering ports having rearwardly convergent sides in the sleeve forward of the flange and establishing open communication between the upstream chamber and the cylinder bore, an orifice in the sleeve rearward of the flange and establishing open communication between the cylinder bore and the downstream chamber and adapted to establish a pressure drop between the fluid in the cylinder bore and the fluid in the downstream chamber, an elongate plunger in the cylinder bore having a base spaced rearward of the orifice, a stem of reduced diameter projecting forwardly from the base, and a piston head at the forward end of the stem to normally occur forward of the metering ports, a longitudinal flow passage extending into the plunger from the front end of the piston and a lateral port in the stem and communicating with the flow passage, said lateral port and flow passage adapted to conduct fluid into the cylinder bore forward of the piston to urge the piston rearwardly into lapped engagement with the metering port in the sleeve to control the flow of fluid therethrough, buffer means to control the rate at which the plunger moves in the sleeve and including an orifice in the head at the rear end of the sleeve and conducting fluid into and out of the cylinder bore rearward of the plunger base, and a compression spring in the cylinder bore between the plunger base and the head at the rear end of the sleeve and normally yieldingly urging the plunger forward and against the action of the fluid on the piston head.

10. A flow limiter of the character described, including, an elongate body having front and rear ends, an inlet passage in the front end of the body, an outlet passage in the rear end of the body, an elongate longitudinally disposed bore in the body extending between and connected with the inlet and outlet passages, an elongate flow control sleeve of smaller diameter than the bore in the body and engaged in the bore in the body to extend between the inlet and outlet passages, a radially outwardly projecting flange-like partition intermediate the ends of the sleeve and sealed with the bore in the body to establish upstream and downstream chambers about the sleeve, a central longitudinally disposed cylinder bore in the sleeve, heads at the ends of the sleeve and closing the cylinder bore, a plurality of circumferentially spaced semi-curvilinear triangular metering ports in the sleeve forward of the flange having bases extending transverse the longitudinal axis of the sleeve and having rearwardly convergent sides and establishing open communication between the upstream chamber and the cylinder bore, a plurality of circumferentially spaced orifices in the sleeve rearward of the flange and establishing open communication between the cylinder bore and the downstream chamber and adapted to establish a pressure drop between the fluid in the cylinder bore and the fluid in the downstream chamber, an elongate plunger in the cylinder bore having a base spaced rearward of the orifices, a stem of reduced diameter projecting forwardly from the base, and a piston head at the forward end of the stem to normally occur forward of the metering ports, a longitudinal flow passage extending into the plunger from the front end of the piston and a lateral port in the stem and communicating with the flow passage, said lateral port and flow passage adapted to conduct fluid into the cylinder bore forward of the piston to urge the piston rearwardly into lapped engagement with the metering port in the sleeve to control the flow of fluid therethrough, buffer means to control the rate at which the plunger moves in the sleeve and including an orifice in the head at the rear end of the sleeve and conducting fluid into and out of the cylinder bore rearward of the plunger base, and a compression spring in the cylinder bore between the plunger base and the head at the rear end of the sleeve and normally yieldingly urging the plunger forward and against the action of the fluid on the piston head.

References Cited in the file of this patent
UNITED STATES PATENTS

| | | |
|---|---|---|
| 2,570,317 | Busson | Oct. 9, 1951 |
| 2,646,078 | Adams | July 21, 1953 |